Jan. 31, 1928.  J. S. REID  1,657,588
HUB CAP
Filed Aug. 19, 1922   2 Sheets-Sheet 1
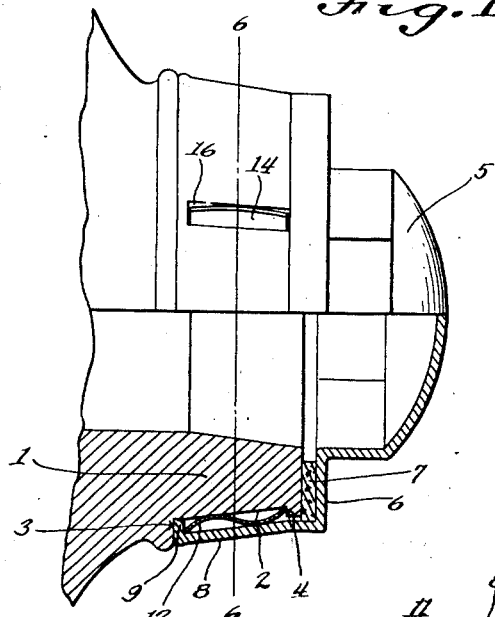
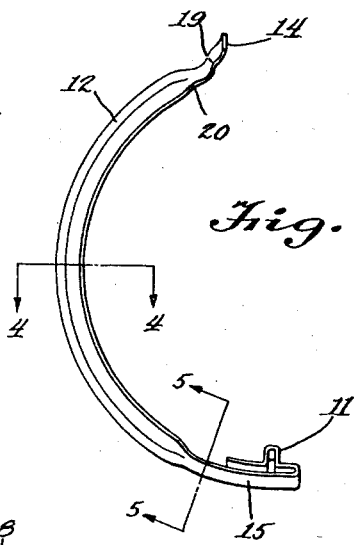
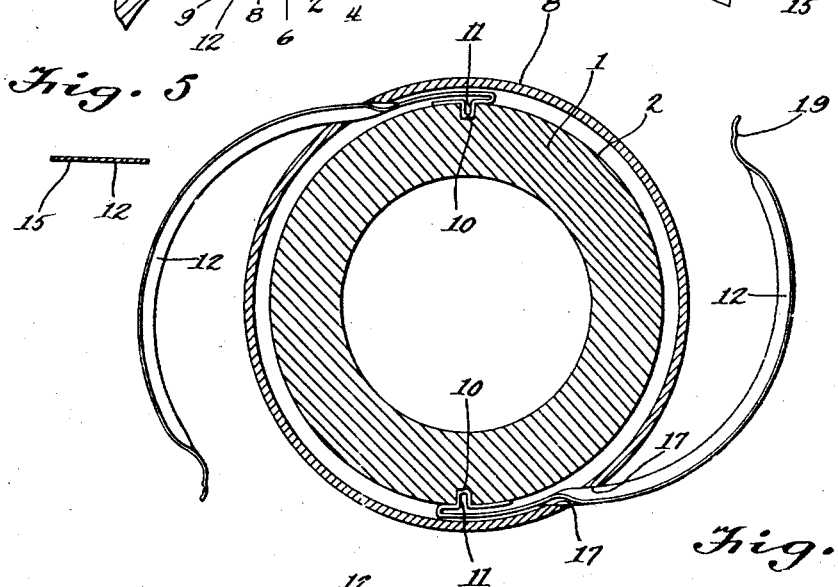
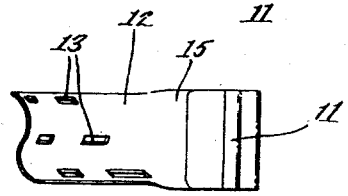
Inventor
James Sims Reid
By Brockett & Hyde
Attorneys Jan. 31, 1928. 1,657,588
J. S. REID
HUB CAP
Filed Aug. 19, 1922 2 Sheets-Sheet 2
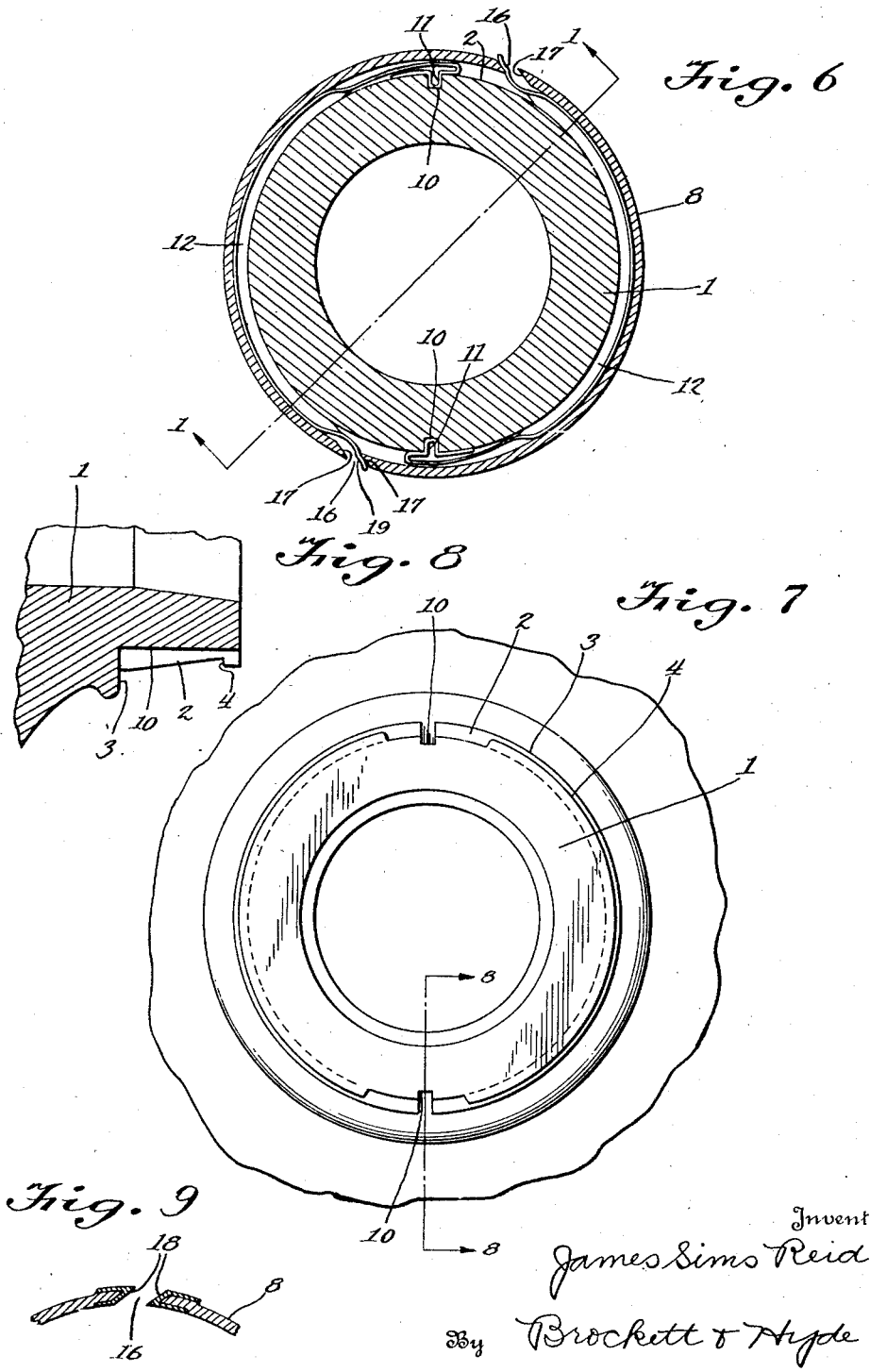

Patented Jan. 31, 1928.

1,657,588

UNITED STATES PATENT OFFICE.

JAMES SIMS REID, OF CLEVELAND, OHIO, ASSIGNOR TO THE EASY-ON CAP COMPANY, OF CLEVELAND, OHIO, A CORPORATION OF OHIO.

HUB CAP.

Application filed August 19, 1922. Serial No. 582,999.

This invention relates to improvements in hub caps for automobiles and the like.

The object of this invention is to provide an improved means for securing the cap upon the hub of an automobile wheel whereby the same can be readily attached to the hub but which cannot be removed without the use of a wrench.

It is furthermore the object of this invention to provide means for securing a cap upon an automobile wheel hub in such a manner that the elements constituting the securing means are located on the outside of the hub.

A further object of this invention is to provide a hub cap securing means including a spring strip which is adapted to be snapped into engagement between the cap and the hub upon rotary movement of the cap, and which cap is sealed against the entrance of dirt and other foreign matter.

Other objects of this invention will appear from the following description and claims when considered together with the accompanying drawings.

Referring to the drawings, which represent one suitable embodiment of my invention, Fig. 1 is a side elevation of my improved closure, part thereof being in section on the line 1—1, Fig. 6; Fig. 2 is a cross sectional view on the line 6—6, Fig. 1, but with the cap and the locking strips in initial position; Fig. 3 is a perspective view of one of the spring locking strips; Fig. 4 is a plan view of one end of the locking strip and illustrating a modification, said view including a section on the line 4—4, Fig. 3; Fig. 5 is a cross section of the locking strip taken on the line 5—5, Fig. 3; Fig. 6 is a cross sectional view of the entire structure on the line 6—6, Fig. 1; Fig. 7 is an elevation of the outer end of the hub; Fig. 8 is a detail sectional view thereof on the line 8—8, Fig. 7; and Fig. 9 is a detail sectional view of a portion of the cap across one of the locking member slots thereof.

The hub 1 is provided with an annular recess 2 between an inner shoulder 3 and an outer shoulder 4. The cap 5 is provided with the shoulder 6 which is adapted to seat the sealing gasket 7 against the end of the hub so as to effect a sealed closure to prevent the entrance of dirt and other foreign matter. The hub cap is furthermore provided with a flared skirt portion 8 which terminates in the inwardly extending flange 9. The flange 9 is adapted to be seated upon the shoulder 3 when the parts are assembled.

The hub is provided with diametrically opposed depressions or recesses indicated by reference numeral 10 which are adapted to receive the bent portion 11 on one end of each of the annular spring locking members 12. The members 12 are adapted to be seated within the annular recess 2 and to have their outer and inner edge portions engage the shoulder 4 and the flange 9 when the parts are in assembly. The spring strips 12 may or may not be provided with slots indicated at 13 for the purpose of adding to the flexibility of the same. These strips are for the most part of an S-shape in cross section, as illustrated in the drawing, except at the end portions where they are flat as indicated at 14 and 15. The spring strips are adapted to be fed through the slots 16 provided at diametrically opposite points in the skirt portion 8 of the hub cap. The slots 16 are interior openings, that is, they are spaced from the longitudinal edge portions of the spring strips 12, and formed with inclined edges, as indicated at 17, and may be furthermore re-enforced by means of eyelets 18, as shown in Fig. 9, if desired. The bent or hump portions 11 are adapted to be set down into the correspondingly formed recesses 10, as clearly illustrated in the drawings. The other end portions of the spring strips are provided with the shoulders 19 so as to engage the edges 17 of the openings and form a snap locking engagement therewith.

In order to apply the hub cap to the hub and to lock the same thereon, the spring strips are placed within the skirt portion of the hub cap with the greater portion thereof extending out through the slots 16, the bent end portions 11 being within the hub cap. The end portions 11 are then inserted within the correspondingly formed recesses 10 of the hub and the cap is rotated upon the hub in proper direction to feed the spring strips inwardly through the slots 16 until finally the free end portions of the spring strips will snap into engagement with the slots 16. During the rotary movement of the hub cap, the spring strips are being compressed between the bottom of the recess 2 and the inner face of the skirt portion 8 in such a manner as to force the outer and inner edges of the strips into abutting engagement with the shoulder 4 and skirt flange 9. In other words, the curvature of the spring strips throughout the main portion thereof is greater than the space between the bottom of the recess 2 and the inner face of the skirt portion 8, so that it is necessary for the spring strips to be flattened out somewhat in order to accommodate themselves to the annular space between the hub and the hub cap. The binding engagement of the edge portions of the spring strips against the shoulder 4 and the flange 9 prevents accidental movement of the hub cap in a direction corresponding to the axis of the hub, while the locking engagement of the two ends of the spring strips with the hub and the hub cap in the manner described, prevents accidental rotary movement of the hub cap. The hub cap can, however, be removed by means of a suitable wrench.

It is to be understood that the number of spring strips employed as well as the depth of the slots for receiving the same may be varied as may also other details of the structure here disclosed, the present form being intended merely for purposes of illustration.

What I claim is:—

1. A closure of the class described, comprising a tubular member having an outer annular recess, a cap surrounding the end of said member and the recess thereof and having an interior opening, and a locking member adapted for locking engagement in said opening and recess upon rotation of said cap.

2. A closure of the class described, comprising a tubular member having an outer recess, a cap having an opening, and a locking member adapted to be fed through said opening into said recess upon rotation of said cap, and anchoring means for said locking member.

3. A closure of the class described, comprising a tubular member having an outer recess, a cap having an opening, a locking member adapted to be fed through said opening and into said recess and between the cap and tubular member upon rotation of the cap and a sealing gasket for said cap, said cap and tubular member having portions engaging said locking member, whereby the latter compresses the gasket upon cap rotation.

4. A closure of the class described comprising a tubular member having an annular recess, a cap having a slot for cooperation with said recess, and a spring member adapted to be fed through said slot and to have its end portions locked in said recess and slot upon rotation of said cap.

5. A closure of the class described, comprising a tubular member provided with an abutment, a cap having an interior opening through its wall and provided with an abutment, and a locking member adapted upon cap rotation to be fed through said opening and into locking engagement between said abutments, whereby axial movement of said cap upon said tubular member is prevented, the end portions of said locking member being adapted for locking engagement with said tubular member and cap, whereby rotary movement of said cap is prevented.

6. A closure of the class described, comprising a tubular member provided with spaced abutments, a cap having a slot, and an extensible, flexible locking strip adapted to be expanded between said abutments and to engage in said slot to effect locking engagement between the tubular member and cap upon rotation of the cap.

7. A closure of the class described, comprising a tubular member having a longitudinal slot and an annular recess, a cap, and a locking member associated therewith and having a portion engaging in the slot of the tubular member and adapted to be fed into its annular recess upon rotary movement of said cap to lock the cap and tubular member together.

8. A closure of the class described, comprising a tubular member having spaced abutments, a cap having an opening, and a locking member adapted to be fed circumferentially through said cap opening to a position between the abutments of the tubular member upon rotary cap movement, to releasably lock the tubular member and cap together.

9. A closure of the class described, comprising a tubular member having spaced abutments, a cap having an opening, and a locking member anchored to the tubular member and adapted to be fed circumferentially through said cap opening into a position between the spaced abutments upon rotary movement of the cap whereby the cap and tubular member are releasably secured together.

In testimony whereof I hereby affix my signature.

JAMES SIMS REID.